Nov. 22, 1938.  D. D. GOLDBERG  2,137,874
VALVE CONTROL MECHANISM
Filed Dec. 19, 1935
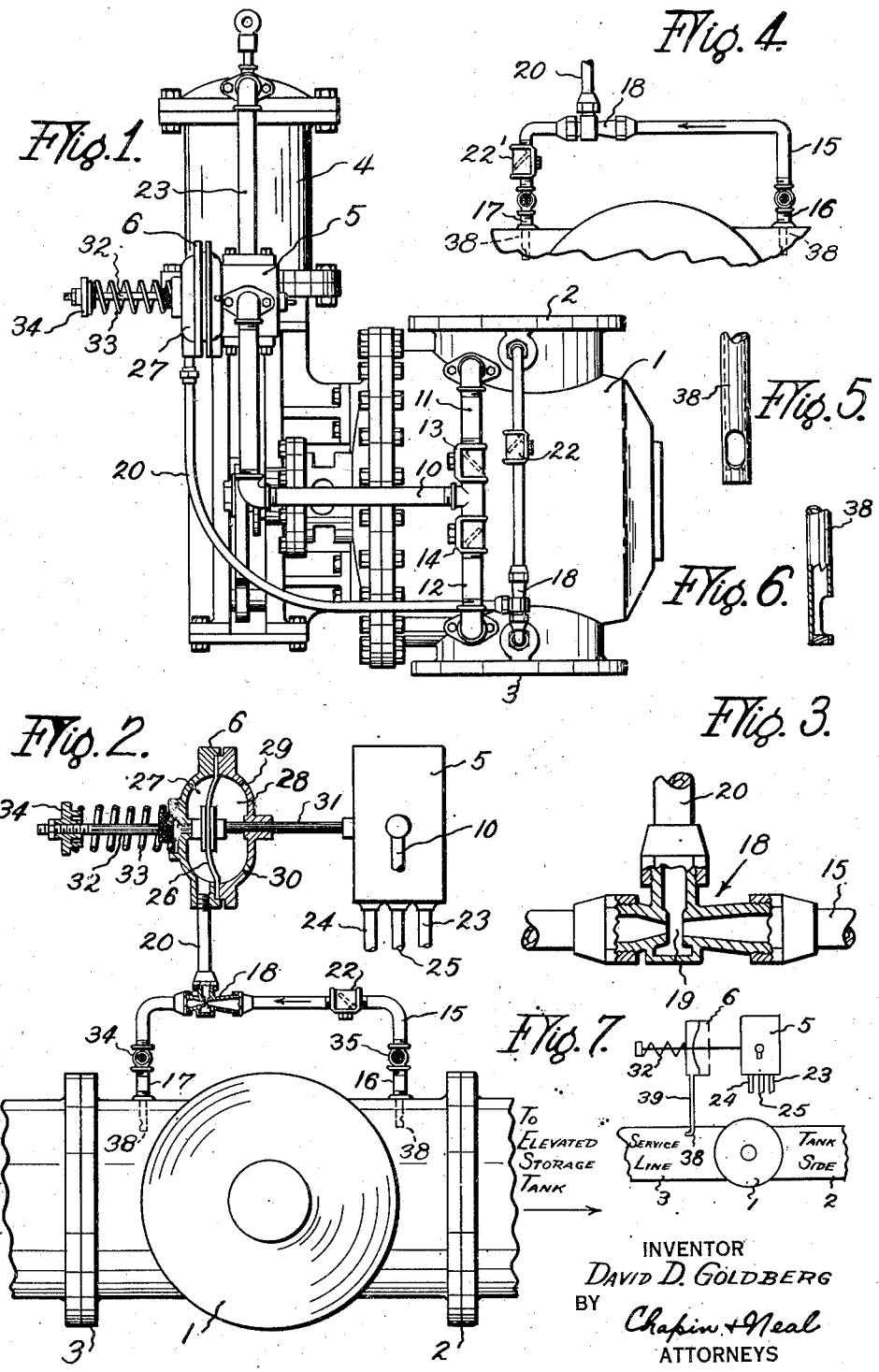
INVENTOR
DAVID D. GOLDBERG
BY
Chapin + Neal
ATTORNEYS Patented Nov. 22, 1938

2,137,874

UNITED STATES PATENT OFFICE 2,137,874

VALVE CONTROL MECHANISM

David D. Goldberg, Springfield, Mass., assignor to Automatic Cone Valve Company, Indian Orchard, Mass., a corporation of Illinois Application December 19, 1935, Serial No. 55,244

5 Claims. (Cl. 137—153)

This invention relates to automatic control mechanism for power operated valves in fluid conduits, and more particularly to the control of altitude valves. Such a valve is used in a pipe line supplying water to an elevated storage tank or reservoir and functions to maintain a desired level of water in said tank, automatically opening to supply water from the supply line to the tank when the desired level in said tank falls and automatically closing when the desired level in said tank is reached.

In the accompanying drawing my control mechanism is shown in connection with a one pipe system for such elevated storage tanks. In the one pipe system both the supply of water in filling the tank and the drawing off of water from the tank for service pass through the same pipe and control valve, and the present invention is more particularly for use in such a system.

The disclosure in this application is a continuation in part of my copending application Serial No. 10,226, filed March 9, 1935, Patent No. 2,025,411, December 24, 1935.

Referring to the drawing which illustrates the preferred embodiment of the invention, Fig. 1 is a top plan view of a valve casing, power means for operating the valve therein and of the automatic control mechanism therefor;

Fig. 2 is a view of the control mechanism partly in section and with the parts diagrammatically arranged to better explain the operation;

Fig. 3 is a detail sectional view, on a larger scale, of the Venturi passage; and Fig. 4 is a diagrammatic view showing an alternative arrangement;

Fig. 5 and Fig. 6 are detail views of a pitometer which may be employed at one or both ends of the by-pass pipe when desired; and Fig. 7 is a diagram illustrating an alternative form of arrangement for the control of an altitude valve.

The details of construction of the main valve in the conduit, the hydraulic power means for operating said valve, the four-way control valve for said hydraulic power means and the pressure actuated diaphragm for operating said four-way valve are all as illustrated and described in my Patent No. 1,890,678, dated December 13, 1932 and therefore need not be particularly described herein.

The main valve casing is indicated at 1, and it will be understood that its respective flanged ends 2 and 3 will be connected in the usual way in a pipe line or conduit. The main valve within the casing 1 is preferably of a rotating plug type and the operating connections between the stem of said plug and the piston of the hydraulic power cylinder 4 are as described in my patent referred to.

Within the casing 5 is mounted the four-way control valve for the hydraulic cylinder 4 and the casing for the pressure actuated diaphragm control adjacent thereto, is indicated at 6.

Pipe 10 is a power line for conveying fluid power to the four-way valve casing 5 for distribution therein to the proper port in the cylinder 4. Power line 10 may receive its fluid power from any convenient source but in the present embodiment is connected to the main conduit at both sides of the valve by branches 11 and 12 as shown, check valves 13 and 14 being provided in said branch lines to prevent by-passing of fluid around the main valve and permitting the power line 10 to receive fluid from whichever side of the valve is under fluid pressure. 23 and 24 are the fluid distributing pipes from the casing 5 to the upper and lower ends of cylinder 4 respectively and pipe 25 is the drain pipe from casing 5.

The diaphragm casing 6 houses therein the movable member or diaphaagm 26 which serves as the main valve control member. At the left side of said diaphragm is a pressure chamber 27. The chamber 28 at the right of the diaphragm is always at atmospheric pressure being open thereto by the orifices 29 and 30. One side of the diaphragm 26 is connected by rod 31 to the piston of the four-way valve in casing 5 and the other side of said diaphragm is fastened to a rod 32 through which it is normally urged to its left hand position as shown, by means of the spring 33. A gravity device with means for adjusting its weight might be equally well employed in place of the spring 33. The cap 34 screw threaded on the end of rod 32 serves as an adjustment for the tension of spring 33. The pressure in chamber 27 tends to move the diaphragm 26 to the right and when in this position the four-way control valve will effect closing of the main valve. The opening of the main valve is effected by the spring 33 in moving the diaphragm 26 to the left, and the spring opposing the pressure in chamber 27 is adjusted to determine the desired level of water in the storage tank.

By-pass pipe 15 is connected at its ends 16 and 17 to the interior of the valve casing 1 at opposite sides of the valve as shown, so as to by-pass water around the valve in the direction of the arrows shown whenever the pressure on the left side of the valve is lower than on the right side thereof. A check valve 22 prevents flow through the by-pass pipe 15 in a direction opposite to that shown by the arrows therein. At a portion of the pipe 15 between the check valve 22 and the end 17, is provided the Venturi passage 18 having its constricted throat 19. A pipe 20 connects the throat 19 of the Venturi passage to the pressure chamber 27 of the diaphragm casing 6. 34 and 35 are suitable hand operated stop valves in the pipe line 15 as shown.

Whenever the storage tank is less than full, that is, not up to the level required, the pressure head thereof as communicated to pressure chamber 27 through pipes 15 and 20, is insufficient to overcome the tension to which spring 33 has been adjusted. Under such conditions the spring 33 holds the diaphragm 26 to the left and the rod 31 will hold the four-way control valve to opening position for the main valve power operated means. Thus the main valve in casing 1 will be open and water will be supplied therethrough to the storage tank. When the proper level in the tank is reached, the pressure head thereof acting in chamber 27 will move the diaphragm 26 to the right and through the instrumentalities described close the main valve.

Assume now with the tank full and the main valve closed, the service line is drawn upon so as to reduce the pressure therein below that of the full tank. Under such conditions there will be a lower pressure at the left of the main valve than at the right in consequence of which a flow will take place in the by-pass pipe 15 and through the Venturi passage 18. This reduces the pressure head in chamber 27 below the force of the spring 33, and the diaphragm will move to the left to open the main valve and thus permit the storage tank to augment the supply in the service line. This will continue until the service line pressure is restored so as to exceed the storage tank pressure head and when this happens the tank will again be resupplied until its proper level is reached for closing the main valve as described.

An advantage in my control mechanism for altitude valves resides in the fact that the arrangement of the by-pass pipe 15 with Venturi passage 18 makes possible the registration on the diaphragm control of a greater differential effect than the mere difference in static pressure at the two sides of the valve. This is of importance when it is desired to have the point of opening the valve determined by slight differences in pressure in the tank and in the service line. The slightest back flow from the tank opens the valve even though pressure differential is very small, but merely enough to cause flow back.

In order to insure that the storage tank may be kept to its required level against depletion from other causes than a draining thereof through the main valve 1, it may be desirable to place the check valve between the end 17 and the venturi 18 as shown at 22' in Fig. 4 so that when the main valve is closed pressure chamber 27 is directly responsive to the pressure in the tank irrespective of an excess pressure in the supply and service line.

By the arrangements shown I have obtained a magnified effect of a pressure differential and it is obvious that equivalent forms of my invention and arrangement may be employed in many other installations wherein it is desired to control the operation of a valve upon the occurence of a relatively slight pressure differential at opposite sides of the same.

One or both ends of the by-pass pipe 15 may if desired be provided with a pitometer such as shown in Fig. 5 and Fig. 6, and when used such pitometer or pitometers are arranged in relation to the check valve 22 or 22' so as to induce a diminished pressure head in the chamber 27 whenever the tank is discharging through the valve to the service line. This arrangement will insure the continued and full opening of the valve during said discharge even though the pressure differential at opposite sides of the valve becomes negligible as may occur after the valve starts opening.

Furthermore, the use of a pitometer at the end of the by-pass pipe 15 in proper relation to the check valve therein, will cause the valve to close more nearly at the exact tank level as predetermined by adjustment of spring 32. In this case the pitometer should be arranged to register in chamber 27 the velocity pressure of the flow toward the tank as well as the static pressure or diminished pressure head. For example, in the arrangement shown in Fig. 2 with the check valve 22 at the right of the Venturi passage 18 a pitometer such as 38 may be at the end 17 of said by-pass pipe 15, with the opening of said pitometer facing to the left away from the tank so as to receive the velocity pressure of any flow to the tank and transmit said pressure to the chamber 27. In this arrangement a second pitometer may also be employed at the end 16 of said by-pass pipe facing to the right which will be of assistance in inducing the flow through the by-pass when the tank is discharging to the service line.

In the arrangement shown in Fig. 4 however, wherein the check valve 22' is at the left of the Venturi passage 18, a pitometer if used should be at each end of the by-pass pipe 15 and both said pitometers should face to the left or toward the service line so as to register in chamber 27 both velocity and static pressure of a flow toward the tank, and also induce a diminished pressure head in chamber 27 when the flow is away from the tank.

The function of the pitometer in communicating to chamber 27 both velocity and static pressure of the flow toward the tank may be obtained as illustrated in the diagrammatic view Fig. 7, viz. by merely a single pipe 39 leading from the pitometer 38 on the service side of said valve 1 to the chamber 27. This arrangement will also insure the continued opening of the valve after the flow starts from tank to service line, but will not have the advantage of the construction shown in the other views in causing the valve to open initially at a very slight difference of pressure between the tank and service lines.

I claim:

1. Automatic control mechanism for an altitude valve located in a conduit between an elevated storage tank and a service line comprising, a control member for controlling the operation of said valve and movable to and from positions corresponding to valve opening and valve closing positions, means providing an unvarying force acting on said control member tending to move the same to valve opening position, means whereby fluid pressure in said conduit acts on said control member tending to move the same to valve closing position comprising a fluid pressure chamber at one side of said control member, a by-pass connected in said conduit around the valve, a Venturi passage in said by-pass, and a pipe connecting the throat of the Venturi passage to said fluid pressure chamber, and a check valve in the by-pass at one side of the Venturi passage to prevent flow through the by-pass in the direction of the tank.

2. Automatic control mechanism for an altitude valve located in a conduit between an elevated storage tank and a service line comprising, a control member for controlling the operation of said valve and movable to and from positions corresponding to valve opening and valve closing positions, adjustable spring tension means acting on said control member tending to move it to valve opening position, means whereby fluid pressure in said conduit acts on said control member tending to move the same to valve closing position comprising a fluid pressure chamber at one side of said control member, a by-pass connected in said conduit around the valve, a Venturi passage in said by-pass, a pipe connecting the throat of the Venturi passage to said fluid pressure chamber, and a check valve in the by-pass at one side of the Venturi passage to prevent flow through the by-pass in the direction of the tank.

3. Automatic control mechanism for an altitude valve located in a conduit between an elevated storage tank and a service line comprising, a control member for controlling the operation of said valve and movable to and from positions corresponding to valve opening and valve closing positions, means providing an unvarying force acting on said control member tending to move the same to valve opening position, means whereby fluid pressure in said conduit acts on said control member tending to move the same to valve closing position comprising a fluid pressure chamber at one side of said control member, a by-pass connected in said conduit around the valve, a Venturi passage in said by-pass, a pipe connecting the throat of the Venturi passage to said fluid pressure chamber, and a check valve in the by-pass positioned on the tank side of the Venturi passage to prevent flow through the by-pass in the direction of the tank.

4. Automatic control mechanism for an altitude valve located in a conduit between an elevated storage tank and a service line comprising, a control member for controlling the operation of said valve and movable to and from positions corresponding to valve opening and valve closing positions, means providing an unvarying force acting on said control member tending to move the same to valve opening position, means whereby fluid pressure in said conduit acts on said control member tending to move the same to valve closing position comprising a fluid pressure chamber at one side of said control member, a by-pass connected in said conduit around the valve, a Venturi passage in said by-pass, a pipe connecting the throat of the Venturi passage to said fluid pressure chamber, and a check valve in the by-pass positioned in the service line side of the Venturi passage to prevent flow through the by-pass in the direction of the tank.

5. Automatic control mechanism for an altitude valve located in a conduit between an elevated storage tank and a service line comprising, a control member for controlling the operation of said valve and movable to and from positions corresponding to valve opening and valve closing positions, means providing an unvarying force acting on said control member tending to move the same to valve opening position, means whereby fluid pressure in said conduit acts on said control member tending to move the same to valve closing position comprising a fluid pressure chamber at one side of said control member, a by-pass connected in said conduit around the valve, a Venturi passage in said by-pass, a pipe connecting the throat of the Venturi passage to said fluid pressure chamber, a check valve in the by-pass at one side of the Venturi passage to prevent flow through the by-pass in the direction of the tank, and a pitometer at one or both ends of said by-pass, the arrangement of said check valve and pitometer or pitometers being such that upon flow through the valve to the tank both static and velocity pressure of the flow will be registered in said fluid pressure chamber, and upon flow through the valve from the tank a diminished pressure head will be induced in said chamber.

DAVID D. GOLDBERG.